United States Patent
Mundra et al.

(10) Patent No.: US 7,356,021 B2
(45) Date of Patent: Apr. 8, 2008

(54) INCREASING THE THROUGHPUT OF VOICE OVER INTERNET PROTOCOL DATA ON WIRELESS LOCAL AREA NETWORKS

(75) Inventors: Satish Kumar M. Mundra, Germantown, MD (US); David A. Lide, Rockville, MD (US); Praphul Chandra, Germantown, MD (US); Manoj Sindhwani, Oak Hill, VA (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 10/953,294

(22) Filed: Sep. 29, 2004

(65) Prior Publication Data

US 2006/0072495 A1 Apr. 6, 2006

(51) Int. Cl.
*H04J 3/24* (2006.01)
*H04L 1/00* (2006.01)
(52) U.S. Cl. .................. 370/349; 370/229; 370/473
(58) Field of Classification Search ............... 370/229, 370/230, 474; 455/414.1, 420, 422.1, 445; 709/233
See application file for complete search history.

(56) References Cited

U.S. PATENT DOCUMENTS

| | | | |
|---|---|---|---|
| 6,003,089 A * | 12/1999 | Shaffer et al. | 709/233 |
| 6,757,256 B1 | 6/2004 | Anandakumar et al. | |
| 2002/0089602 A1 * | 7/2002 | Sullivan | 348/500 |
| 2004/0068668 A1 * | 4/2004 | Lor et al. | 713/201 |

OTHER PUBLICATIONS

Sachin Gar et al, "On the Throughput of 802.11b Networks for VoIP", Mar. 13, 2002, pp. 1-13.
Arunesh Mishra et al, "An Empirical Analysis of the IEEE 802.11 MAC Layer Handoff Process" (8 pages).

* cited by examiner

*Primary Examiner*—Duc M. Nguyen
*Assistant Examiner*—Michael Thier
(74) *Attorney, Agent, or Firm*—Steven A. Shaw; W. James Brady; Frederick J. Telecky, Jr.

(57) ABSTRACT

A system and method are provided for improving the throughput of wireless networks, such as IEEE 802.11 networks. Individual devices in the network determine the level of activity on the network. In the event that the network is active, the devices increase throughput by skipping the pending packet transmission and appending its data payload to a future packet transmission. By encoding multiple payloads in a single packet transmission, packet overhead is reduced and MAC layer delays are eliminated. The data payloads are subsequently split back into individual packets for transmission over the wired portion of the network.

6 Claims, 3 Drawing Sheets

INCREASING THE THROUGHPUT OF VOICE OVER INTERNET PROTOCOL DATA ON WIRELESS LOCAL AREA NETWORKS

CROSS-REFERENCE TO RELATED APPLICATIONS

None

FIELD OF THE INVENTION

The invention relates generally to data transfer over wireless local area networks (WLANs). More specifically, it pertains to IEEE (Institute of Electrical and Electronics Engineers) 802.11 wireless networks, particularly those being used for voice over Internet Protocol (VoIP) with multiple simultaneous wireless endpoint stations.

BACKGROUND OF THE INVENTION

The IEEE 802.11 wireless communication protocol is a system by which devices can send and receive information over a wireless link using Internet Protocols. In considering the maximum rate at which information can be transmitted across the link (throughput), there are three limitations.

The first limitation is physical. That is, there is a physical limitation to the speed at which the devices can input or retrieve information, encode it, and transmit across the wireless link. For 802.11b networks, this maximum speed is about 11 Mb/sec (Mega bit per second). This represents the maximum transmission rate of the system, but actual data transmission rates are much lower because of the other throughput limitations.

When information, either voice or data, is transmitted over an IP network, it is first encoded and broken down into pieces called packets. Each packet comprises a payload, which is the information that is transmitted from sender to receiver(s), and a header, which is information that the network uses to route the packet, and to decode and reassemble the information when it reaches its destination. It is clear that the amount of data contained in the packet header in relation to the total packet size is a second limitation on the throughput of the network. Clearly, throughput is higher when there is a large data payload compared to the total packet size than when there is a small data payload compared to the total packet size. However, while throughput may be an advantage to using large packet sizes, there are also disadvantages.

For example, a given packet may be lost while traversing the wired portion of the wireless network. When the packet is large, the missing information is difficult to conceal; and if the link is for voice transmission, large lost packets may significantly reduce the voice quality. There are other disadvantages to large packets specific to VoIP applications, such has a high end-to-end delay. Furthermore, the devices on the network may have limitations on packet size. For these reasons, VoIP architectures in particular are generally limited to packetization periods of 10, 20 or 30 millisecond (msec).

A third limitation on throughput is the Medium Access Protocol (MAC.) IEEE 802.11b wireless networks use a CSMA/CA (Carrier Sense Multiple Access with Collision Avoidance) medium access protocol. This is a system in which an access point, which is connected to the wired network, can serve several wireless Stations (STA) simultaneously.

A collision occurs when two packets are transmitted at the same time from two different STAs on the wireless network. In such a case, the information from both packets may be lost. Because the wireless network cannot detect collisions, it uses a MAC that is designed to avoid collisions. If a STA wants to send a frame, it listens to the medium for a period of time known as the distributed coordination function inter-frame spacing time, or DIFS, to determine that no other STA is currently transmitting. After waiting the appropriate time with no activity in the medium, the STA may then transmit a packet. When there are few STAs and the network is not very busy, throughput on the wireless leg, even with small packets may be fairly high.

If there are multiple STA, or the STA are very active, there will be significant reductions in throughput for each STA. Referring to FIG. 3, when a packet transmission 10 ends, the system waits for the short inter-frame spacing period or SIFS period 14. Then, an acknowledgment 11 is sent from the recipient of the packet to the transmitting STA to confirm packet receipt. If the STA wants to send another packet immediately, it is still required to listen to the medium for the DIFS period 15. Then, rather than transmitting, the STA enters into a contention phase 16 for the medium. During the contention phase 16, the STA that are waiting to transmit a packet are queued up in random order and they take turns transmitting packets 12 and receiving acknowledgments. FIG. 3 shows the transmitted packet 12 in two parts, the IP/UDP header 13 and the actual data payload 19. The time during which the STA is contending to transmit or transmitting non-payload information 17 is substantially longer than the time period during which the STA is transmitting actual payload information 18.

The CSMA/CA protocol is designed to avoid collisions and data loss, but it also has the effect of adding a significant amount of delay to packet transmission. For very short packets, the added delay is a more severe constraint on throughput.

To summarize, there are three main limitations on data throughput for an 802.11 wireless network connection: the physical limitation; the size of the packet header to the total packet size, also known as packet overhead; and the medium access protocol. When the information being transmitted over the wireless link is just data, periods of low throughput may be tolerable. In VoIP and other real-time applications, such as streaming media, limited throughput may lead to reduced or unacceptable voice or sound quality.

It can be seen that, for a wireless local area network (WLAN), it is desirable to have the option of using larger packets to reduce packet overhead, reduce MAC delays and increase throughput in the wireless leg. However, packet size cannot be too large because of end-to-end delays inherent in the use of large packets in VoIP applications.

SUMMARY OF THE INVENTION

The present invention improves the throughput of IEEE 802.11 networks by controlling the packet size dynamically in relation to the level of activity at a given 802.11 access point. If there is a high amount of traffic at the access point, the packet size is increased relative to the total header size. This has the effect of increasing throughput of the wireless leg of the transmission during periods of peak activity by reducing the packet overhead and MAC delays.

Voice and audio data transmitted over Internet Protocols can be encoded using a number of protocols and codecs, but the most common are the ITU G.711 a-Law codec and G.729 codec. Each of these allows the packetization period to vary from 10 mSec audio payload to 100 mSec audio payload. The G.729 codec allows for more data compression, which improves the throughput of the wireless network.

In order to improve throughput over the wireless leg of the network, an implementation of a proxy/mixer function is contemplated which does not require any voice processing capability. An access point itself can be made to function as a proxy for the purpose of the present invention. The dynamic control over the effective packetization period without any signaling involvement is one of the key features of the invention.

Regardless of which codec is used, a novel application of redundancy mechanisms using a real-time protocol (RTP) that permits transmission of redundant payloads in a single packet, is used in the exemplary embodiment of the present invention. Some examples of such mechanisms are RFC2198 (Request For Comments2198, RTP Payload for Redundant Audio Data, C. Perkins, I. Kouvelas, O. Hodson, V. Hardman, M. Handley, J. C. Bolot, A. Vega-Garcia, S. FosseParisis, September 1997), and RFC 2733 (Request For Comments2733, An RTP Payload Format for Generic Forward Error Correction, J. Rosenberg, H. Schulzrinne, December 1999

The primary goal in using a redundancy mechanism is not redundancy but increasing the effective packetization period for a VoIP call on the wireless leg of the connection. For example, RFC2198 allows a packet to contain one or more headers, a data payload, and copies of the data payloads from previously transmitted packets. RFC2198 was developed to permit redundant data transmission to protect against packet loss. In the wireless leg of a VoIP connection, packet loss is highly improbable because of the 802.11 medium access protocol. Under this MAC protocol, every packet that is successfully transmitted between an access point (AP) and endpoint station (STA) acknowledged. Unacknowledged packets get re-transmitted.

A STA may keep packet sizes small when the network activity is low. The global use endpoint STA is programmed such that if it is ready to transmit a packet, but determines that the medium is busy, it skips the packet transmission and appends the untransmitted data to the next packet according to the RFC2198 or similar payload format, as if the untransmitted data is a redundant payload. If the STA continues to sense the medium is busy, it repeats this step until the maximum packet size is reached. The STA must then go through the normal contention phase for the medium if it is still busy.

It can be seen that the additional data payloads can be encoded using a technique which provides high compression such that bandwidth can be saved. Also, the number of redundantly encoded payloads can be more than just one. The 14-bit timestamp offset field in the redundant encoding header of the RFC2198 payload format allows up to 2.048 seconds of redundant data to be included with the current packet. It is clear that, given the payload format described, if every alternate packet were not transmitted over the wireless leg, but combined so that two data payloads were transmitted with each packet over the wireless leg, and the playout buffer at the receiver was at least 20 mSec, recovery of all of payloads can be achieved. Generalizing, if k payloads are sent as redundant encoding, full data recovery is possible at the receiving device as long as every k+1th packet is successfully transmitted.

The RFC 2198 payload format adds a small header for each additional payload in a given packet. Thus, each time multiple data payloads are transmitted in a single packet, at least one contention phase may be eliminated and the ratio of total header size to total packet size is significantly smaller than if the data payloads had been transmitted in individual packets.

FIG. 4 shows a timing diagram for a packet transmission in accordance with the present invention. Upon completion of the previous packet transmission from a different Station, the transmitting station waits for the SIFS period 14, the acknowledgment transmission 11, and the DIFS period 15. The same global use "STA" may further be required to wait for a contention period 16. When it comes time for the STA to transmit its current packet, it first transmits the IP/UDP header 13, followed by 32-bit additional headers 19 for each additional payload in the packet, followed by the actual data payloads 21. It is clear from FIG. 4 that the time transmitting payload information 18 is now much longer in comparison to the combined time spent contending to transmit or transmitting non-payload information 17.

A system in accordance with the present invention provides control over voice quality in VoIP applications by controlling end-to-end delay. End-to-end delay is controlled by limiting the size of the packets. The preferred embodiment avoids the disadvantages of using large packets on the wired portion of the network by splitting the packets at the 802.11 access point. An IEEE 802.11 access point is programmed to receive packets in the RFC2198 format and split them into individual packets for transmission over the wired portion of the network. Alternatively, a proxy/mixer unit can be placed upstream from the access point to perform the packet splitting function. Thus, the preferred embodiment permits large packet sizes on the wireless portion of the network thereby allowing increased throughput.

An advantage of the preferred embodiment is interoperability with existing VoIP devices on the wired portion of the network. There should be no conflicts with devices upstream from the 802.11 access point or proxy/mixer. Further, packet sizes are dynamically controlled depending on changing conditions in network traffic on the wireless leg, improving network throughput. Calls are permitted between IP phones that do not transmit via a proxy, which makes deployment wireless IP phones (WIPPs) feasible to deploy in a WLAN.

BRIEF DESCRIPTION OF THE DRAWINGS

For a better understanding of the nature of the present invention, its features and advantages, the subsequent detailed description is presented in connection with accompanying drawings in which.

DETAILED DESCRIPTION OF THE INVENTION

The invention, which may be embodied in hardware, software, or a combination of the two, is a system and method for improving the throughput of wireless local area networks (WLANs), such as IEEE 802.11 wireless networks.

Figure 1:
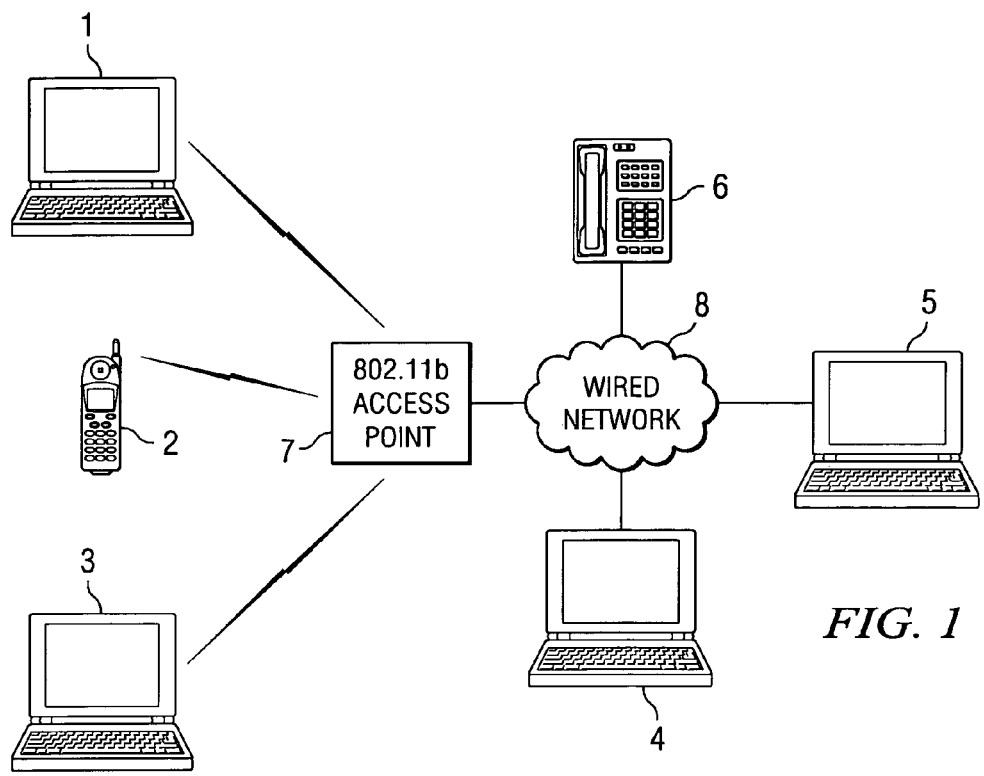
FIG. 1 is a diagram of a typical wireless network access point (AP) serving several wireless STAs, and connecting them to the wired Internet.

In a preferred embodiment, there are one or more endpoint stations (STAs) such as a personal computer 1 and wireless Internet Protocol phone (WIPP) 2 connected wirelessly to the Internet or another wired network via an IEEE 802.11 access point 7 as shown in FIG. 1. The access point 7 is connected to the wired network 8, which is subsequently connected to the receiving devices 4, 5, 6.

Figure 6:
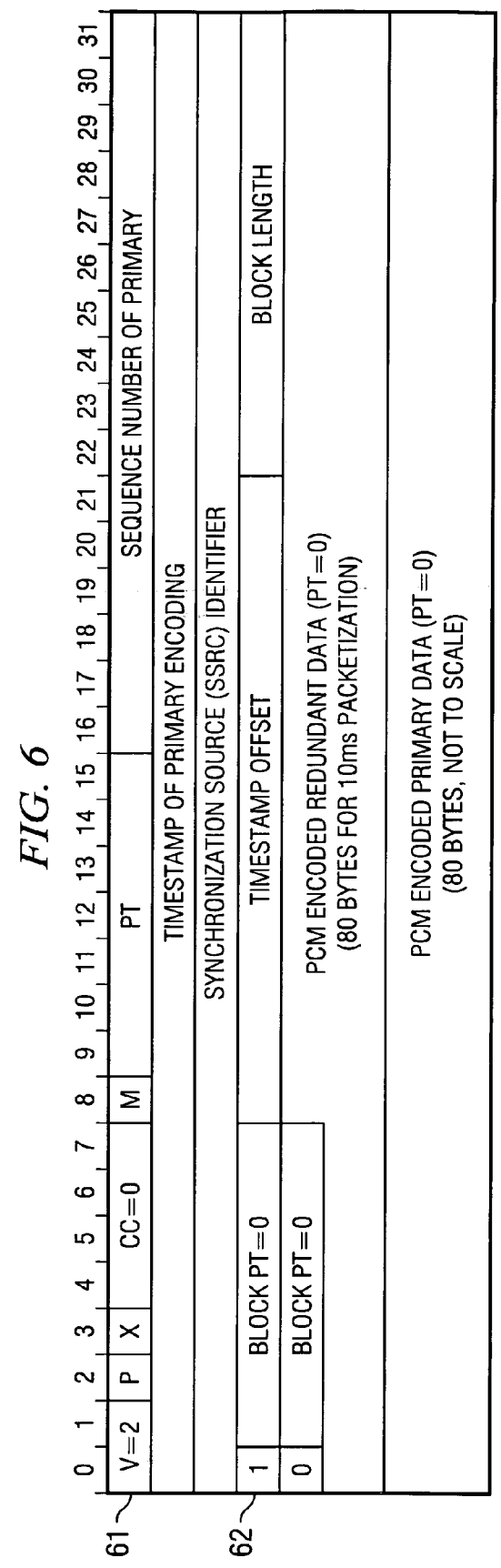
FIG. 6 illustrates a sample RFC2198 formatted packet

The STAs 1 are programmed to employ a payload format with redundancy mechanisms, such as the RFC2198 payload format. A sample RFC2198 packet is shown in FIG. 6. As one skilled in the art will recognize, the RFC2198 is merely an exemplary payload format and other formats may be used to practice the teachings of the present invention. In accordance with the present invention, the packet comprises a standard RTP header 61 with a payload type indicating redundancy. Immediately following the RTP header are a number of additional headers 62 comprising an F bit, a block payload type, a timestamp offset, and a block length. The functions of each part of the additional header are as follows:

F-bit: indicates whether another header block follows. When set to 0, the F-bit indicates no more header blocks in the packet.

Block PT: 7 bit RTP payload type for this block.

Timestamp Offset: 14 bits unsigned offset of timestamp of this block relative to timestamp given in RTP header. The offset allows the individual payloads to be split and re-assembled in proper order without the loss of real-time information.

Block length: 10 bit length in bytes of the corresponding data block excluding header. FIG. 6 the STAs are further programmed to manage the size of the transmitted packets according to the flowchart shown in FIG. 5. According to FIG. 5, the STA 1 first listens to the medium 51 and makes a determination whether or not the medium is busy 52. If the medium is not busy, the STA 1 transmits the current packet 57 and the process repeats when the next packet is ready for transmission.

If the medium is busy, the STA 1 must then determine whether or not it has more data packets that need to be transmitted 54. If the STA 1 has more packets waiting to be transmitted, and the maximum packet size has not been reached 55, the STA 1 appends the current packet onto the next packet 53 in accordance with the RFC2198 payload format, and returns to listening to the medium 51. Under the condition that either there is no more data packets waiting to be transmitted or the maximum packet size has been reached, the STA 1 must enter into the contention phase 56 for the medium in accordance with the CSMA/CA medium access protocol of the 802.11 network. After contention, the packet is transmitted and the process restarts, with the STA listening to the medium 51.

AP 7 is programmed to recognize the RFC2198 payload format and split the larger packet into the original packets with smaller payloads for transmission over the wired portion of the network 8. More specifically, AP 7 receives a packet with multiple payloads in accordance with the RFC2198 payload format. The access point 7 then stores each payload individually, duplicates the IP/UDP and RTP headers and attaches them to each payload along with the appropriate time stamp and encoding information. The additional headers that are characteristic of the RFC2198 payload format are eliminated, and each packet is transmitted over the wired portion of the network 8 to the destination STA 4, 5, and 6.

Figure 2:
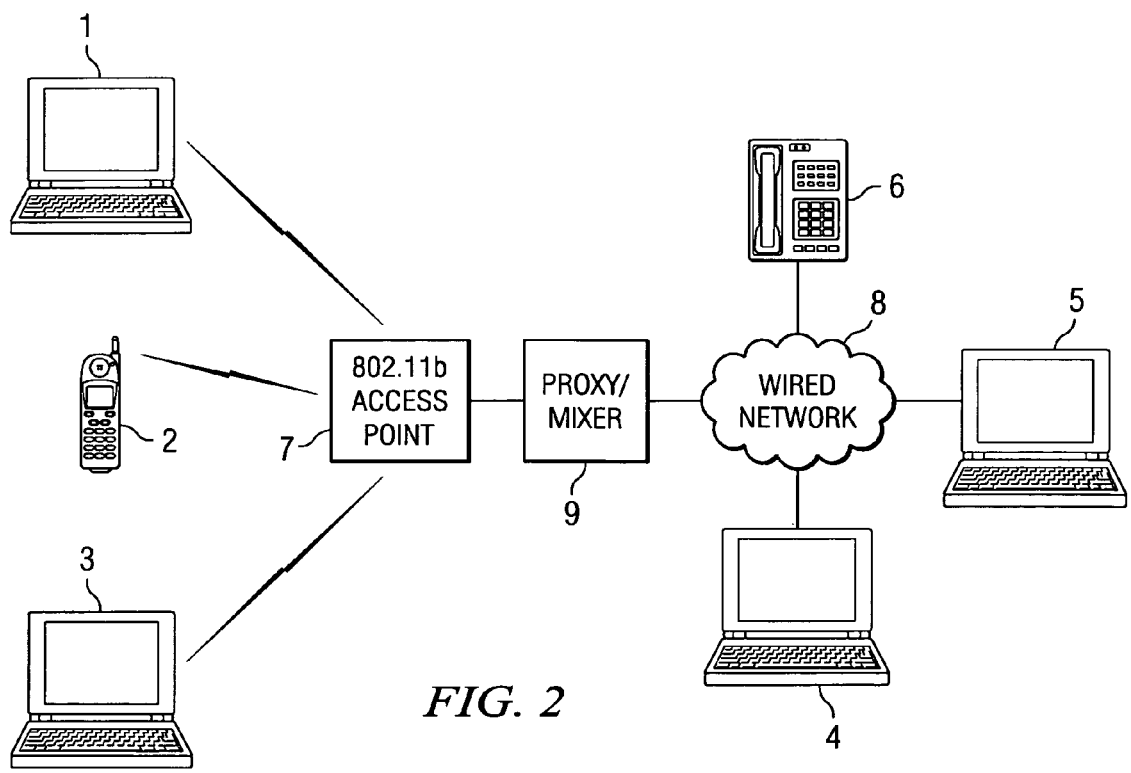
FIG. 2 is a diagram of a wireless network access point serving multiple wireless STAs which includes a proxy/mixer unit.
Figure 3:
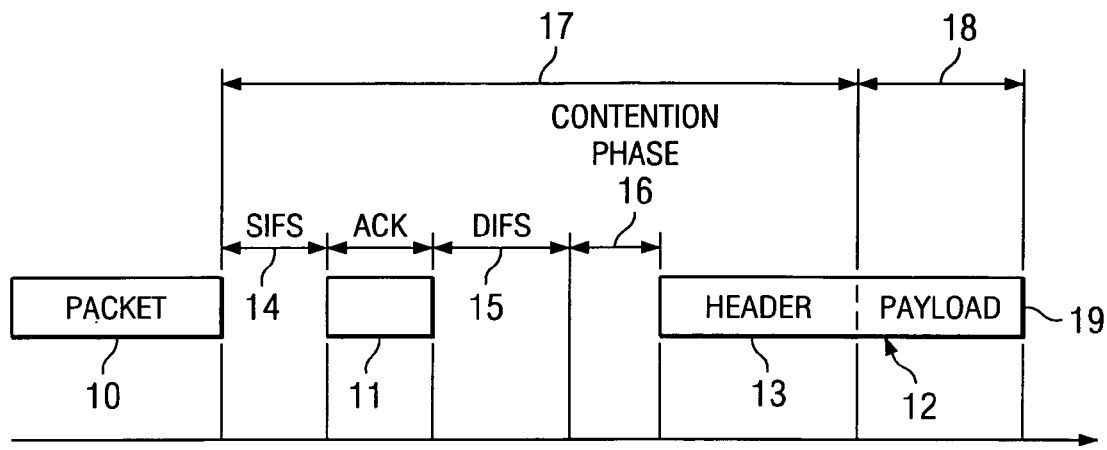
FIG. 3 is a timing diagram that illustrates the amount of throughput overhead for a single packet transmission according to the IEEE 802.11 MAC protocol.

In an alternative exemplary embodiment, the 802.11 access point 7 does not split the larger packet into the original smaller packets. Rather, the splitting function is performed by a proxy/mixer 9 as shown in FIG. 2.

The design and implementation of a proxy/mixer 9 is guided by several issues associated with the use of large packet sizes. First, the use of large packets typically leads to high end-to-end delay due to the buffering that is required at the receiver as it has to collect the large frames. High end-to-end delay results in unacceptable voice quality.

Second, a loss can occur when a large packet traverses a wired IP network. Packet loss concealment techniques do not work well when large packets are lost. Even a small percent of packet loss can lead to unacceptable voice quality.

A third issue pertains to limitations of the gateway (not shown). A gateway device typically acts to convert voice information from wired IP encoding format to a standard public switched telephone network (PSTN) format and vice versa. The gateway device permits standard telephones to communicate over IP. It is not unusual for gateway devices to have limits on the packet sizes that they can support.

A fourth consideration arises from some VoIP architectures such as PacketCable. Architectures such as PacketCable recommend the use of only 10, 20, or 30 mSec packetization periods. Further, the use of asymmetric packetization periods can result in negotiation failure between the two communicating devices.

Finally, it is not always known that the call has a wireless leg. Dynamically changing the packetization period may not always be possible. For example, some control protocols do not permit the gateway to change the packetization period. Such control lies with a call agent.

Therefore, it is important to dynamically change the packet size on the wireless leg of the call only. The large packets transmitted over the wireless leg must be broken up into smaller packets in order to transmit over the wired portion of the IP network 8.

There are other characteristics of wireless networks such as IEEE 802.11 that factor into the proxy server 9 design solution. For example, when there is data traffic along with voice traffic on the network, there may exist periods of congestion due to the bursty nature of data traffic. A fixed packet size for voice may not perform optimally under such conditions. Further, in a wireless network, congestion control is a complex problem due to interference, mobile STAs, and multiple different rates of communication with the access point. Finally, admission control techniques may not work well due to the mobile nature of the STAs and the multiple different communication rates with the access point. This leads to varying network utilization for a given information flow rate.

In 802.11 wireless LANs, every packet is acknowledged, which results in a very low probability of packet loss in the wireless leg. The high link level access and transmission overheads for 802.11 networks results in low effective bandwidth availability when packet sizes are small. The effective bandwidth of the 802.11 network can be increased if, for a voice call, k consecutive packet transmissions are skipped, and the data payloads associated with the skipped packets are appended to the k+1th packet, encoded, for example, as redundant data in accordance with the RFC2198 payload format. This effectively increases the packetization period for the call without involving any end-to-end signaling or capabilities negotiation. The proxy/mixer 9, or access point 7 with proxy functionality, would then split the packets for transmission over the wired network 8 in accordance with the previously negotiated call parameters. The number of data payloads that are encoded as redundant data can be varied dynamically depending on the congestion or end-to-end delay bound on a per call basis and can be independently controlled in each direction. This allows greater control over end-to-end delay and utilization of the wireless channel bandwidth than would be possible by simply negotiating the largest achievable packetization period at the beginning of the call. It can be seen that the preferred embodiment performs best when the negotiated packet size is the smallest size that is available, providing better control over the number of packet transmissions that can be skipped. This results in fine control over network utilization and dynamic adaptability to changing network conditions such that network utilization or voice quality for the call can be optimized.

The constraints which govern the choice of k, the number of packet payloads that can be skipped and sent as redundant encoding with the k+1th packet, are end-to-end delay for the voice call and the current network utilization.

Implementation of a proxy function in accordance with the preferred embodiment is typically dependent on the signaling protocol. However, the basic function of the proxy is to be capable of understanding the media Multipurpose Internet Mail Extensions subtype "RED", which is independent of the signaling protocols in use. There are no voice processing capabilities requirement on the proxy. The capabilities that are required are able to be programmed into the access point itself. In some applications, such as when there is a security function in the VoIP call, it may be necessary to share the session description protocol (SDP) between the proxy and the phone.

The access point 7 or proxy/mixer 9 needs to ensure that when the packets are being split and transmitted on the wired network 8, they are appropriately spaced. If they are not appropriately spaced, the limited jitter buffer on the receiver may overflow. A second possible problem is that inappropriately spaced packets may be perceived as network jitter by the receivers and they may confuse some voice playout techniques. Further, it is desirable to change the values of k, the number of payloads that are not transmitted, at the beginning of a talk spurt so as to minimize any packet drops at the receiver due to early or late arrival of the data payload. The underflow/overflow can also be controlled by properly sizing the nominal delay and maximum delay value for the jitter buffer. However, the adjustments at a talk spurt boundary will allow a smaller value for nominal maximum delay, providing a larger end-to-end delay budget in which the algorithm needs to operate.

The wireless IP phone 2 also needs to employ large enough buffers when employing this technique so that no buffer overflow occurs when many packets or large voice packets arrive.

Smart congestion detection, control and management techniques may be implemented which will enable the selection of k at the beginning of a talk spurt such that the throughput of the 802.11 network can be maximized in the presence of voice calls under given constraints for maintaining voice quality or network utilization at an acceptable level. Note that k is not a fixed quantity for a call, but is varied throughout the call depending on the delay tolerance, observed loss, interference, congestion and network utilization.

There are many possible architectures for deployment of VoIP in a LAN environment, wireless or otherwise. The specific architecture chosen is dependent on the choice of signaling protocol and service provider, which can be VoIP or traditional TDM voice service. The LAN architecture may or may not depend on the service provider architecture or protocol in use and isolation between the two can be provided by IP PBX/Proxy systems, similar to the PBX systems that are in use today in traditional voice networks. If the IP PBX is also functioning in a proxy capacity then there is good isolation and the described invention can be enabled.

Using the RFC2198 payload format, or any other format allowing for flexible packet size, multiple UDP payloads can be sent in a single packet transmission without the SIFS, DIFS, acknowledgment and contention delays inherent in the 802.11 MAC protocol. This payload format further permits large data payloads in relation to the total packet size on the wireless leg of the network. The embodiment further avoids the difficulties associated with transmitting large packets over the wired portion of the network.

Figure 5:
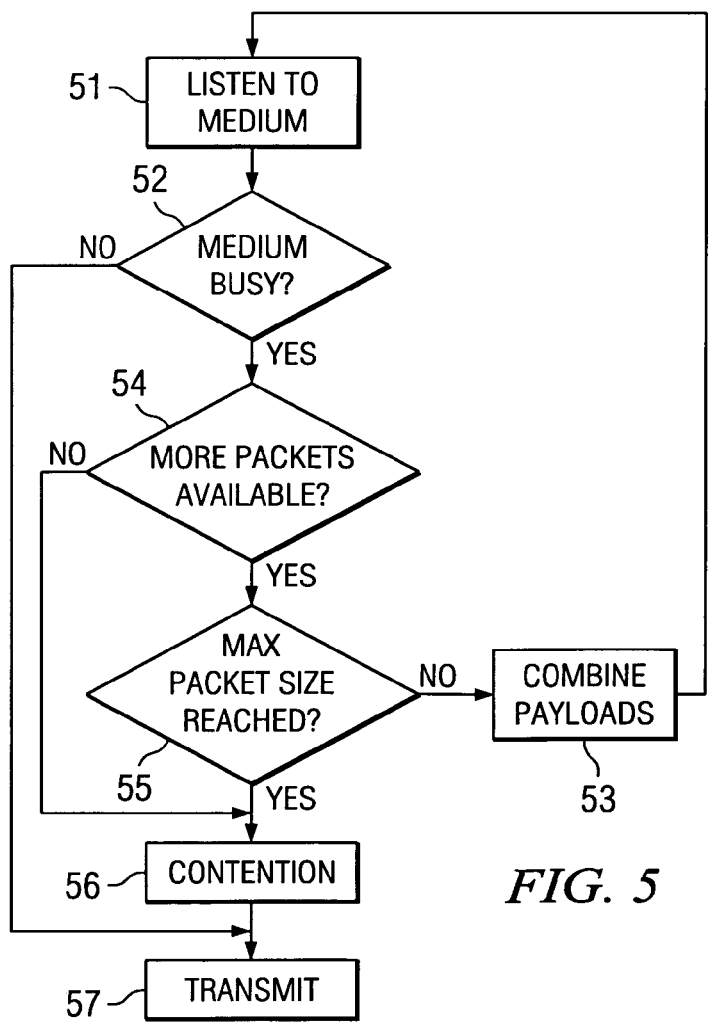
FIG. 5 illustrates the flowchart of the process that allows for dynamic packet length control in accordance with the invention.
Figure 4:
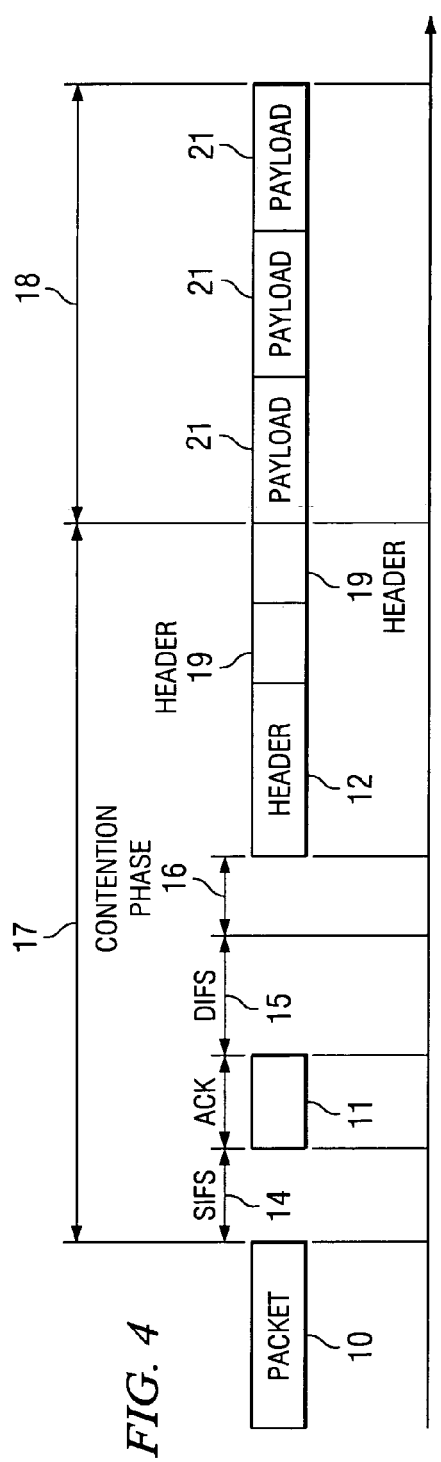
FIG. 4 is a timing diagram in accordance with the invention that shows the reduced packet overhead in the wireless leg of the network.

The preferred embodiment controls the packet length dynamically based on the level of activity on the wireless leg of the network. Longer packets on the wireless leg reduce the amount of fixed overhead per packet and thereby increase network throughput without suffering any of the drawbacks of large packet sizes on the wired portion of the network. The invention permits the STA to avoid one or more contention phases inherent in 802.11 networks for each packet transmitted, further improving network throughput. While FIG. 5 shows one algorithm for dynamically controlling packet size to improve throughput, one skilled in the art will appreciate that there may be methods in which the packet size can be controlled. One method is to transmit as many payloads as are available in a single packet, up to the maximum permissible packet size, with every packet transmission. Still another method is to transmit a constant number of payloads with every packet while following the standard MAC protocol.

One skilled in the art will appreciate that the preferred embodiment can be practiced by other than the described embodiments, which are presented for purposes of illustration and not limitation, and the present invention is limited only by the claims that follow.

The invention claimed is:

1. A method for controlling voice quality of a Voice over Internet Protocol (VoIP) call improving the throughput of a network, having at least one wireless Internet Protocol phone (WIPP); and connected to a wired network for communicating data packets between said wireless Internet Protocol phone (WIPP) and said wired network, comprising:
 determining a plurality of network conditions of said network;
 determining an optimal voice packetization number, k using said plurality of network conditions;
 skipping k consecutive voice packets having full voice payloads;
 saving said payloads in a temporary buffer;
 on the k+1th consecutive voice packet, reformat it to include the previous k saved payloads, encoded as redundant data;
 re-encoding said payloads to a lower bandwidth codec dynamically depending on said plurality of network conditions; and transmitting said loaded packet when said network is available.

2. The method of claim 1 wherein said network includes a wireless leg which is an IEEE 802.11 network.

3. A network, comprising:
a wireless access point connected to a first network;
one or more wireless Internet Protocol phones (WIPP) communicatively linked over a wireless network to said first network through said access point; and
a proxy mixer coupled to said wireless Internet Protocol phones (WIPP) to wirelessly transmit data payloads including Voice over Internet Protocol data to said first network through said wireless access point in a packet transmission, wherein prior to transmission a plurality of network conditions are used to determine an optimal voice packetization number k, said proxy mixer configured to skip k consecutive voice packets having voice payloads and reformat k+1 packet to include the previous k payloads encoded as redundant packets; and
a payload combiner to combine payloads and reencode the payloads to a lower bandwidth condec dynamically depending on the plurality of network conditions.

4. The system of claim 3 wherein said packet transmissions adhere to the RFC2198 payload format.

5. The system of claim 3 wherein said wireless access point in conjunction with said wireless Internet Protocol phones (WIPP) comprise an IEEE 802.11 network.

6. The system of claim 4 wherein said wireless access point and said wireless Internet Protocol phones (WIPP) form an IEEE 802.11 network.

* * * * *